April 15, 1952     P. A. ESTOK     2,593,126
MANUFACTURE OF PIPE PLUGS OR THE LIKE
Filed July 15, 1949     2 SHEETS—SHEET 1

INVENTOR.
PAUL A. ESTOK
BY Hudson, Boughton,
Williams, David & Hoffmann
ATTORNEYS April 15, 1952     P. A. ESTOK     2,593,126
MANUFACTURE OF PIPE PLUGS OR THE LIKE
Filed July 15, 1949     2 SHEETS—SHEET 2

INVENTOR.
PAUL A. ESTOK
BY Hudson Boughton,
Williams, David & Hoffmann.
ATTORNEYS Patented Apr. 15, 1952

2,593,126

UNITED STATES PATENT OFFICE 2,593,126

MANUFACTURE OF PIPE PLUGS OR THE LIKE

Paul A. Estok, Lakewood, Ohio, assignor to The Lamson & Sessions Company, Cleveland, Ohio, a corporation of Ohio Application July 15, 1949, Serial No. 105,024

7 Claims. (Cl. 10—12.5)

This invention relates to the manufacture of pipe plugs or like metal articles by cold working and provides novel apparatus by which articles of this kind of better quality and greater uniformity can be produced more rapidly and economically than has been possible with the methods and apparatus heretofore available. The invention is especially applicable to the manufacture of metal articles of the type having an upset substantially cylindrical threaded body and an integral head of polygonal shape on one end thereof. Since the invention has been successfully applied to the manufacture of pipe plugs and this particular article affords a good example of the advantages obtained, the invention has been disclosed herein by reference to a pipe plug but without intention to limit the invention to the production of this article alone.

Pipe plugs of the kind having a substantially cylindrical body and an integral polygonal head were previously produced as a metal casting which was completed by cutting threads on the cylindrical body with a threading die. This represented a slow and costly method of production and the plugs produced thereby were often found to be more or less irregular in shape.

More recently, pipe plugs have been produced by cold working operations performed on segments of round wire stock during which a portion of the metal provided by such a segment is shaped into a substantially cylindrical body to be roll-threaded and another portion is shaped into a polygonal head. As heretofore carried out these shaping operations for the head and body portions have been possible only by the use of very heavy forming pressures or by the use of several progressive forming steps in successive dies of a series. The use of the heavy pressures needed to convert the round stock into a head of polygonal shape by causing a sufficient flow of metal to properly fill out the corners of the head is objectionable because it causes rapid wearing and frequent breakage of the dies. The use of progressive forming steps in successive dies of a series also has the disadvantage that it makes necessary the use of a progressive or transfer type of multiple station solid die header which is a more complex and expensive machine than a standard conventional double stroke solid die header. Moreover, in these earlier methods of producing pipe plugs from round stock the formation of a flash on the blank has been unavoidable and not only represents waste metal in the form of scrap but must be trimmed off and an additional operation or die station is needed for that purpose.

As one of its objects, the present invention provides novel apparatus for producing pipe plugs of the kind having a substantially cylindrical threaded body and an integral head of polygonal shape, in which a segment of polygonal wire stock is used having substantially the same cross-sectional size and shape as the polygonal head of the completed plug and in which one end of the segment is upset and pressure-formed to the shape of said body while the metal of the other end of the segment is confined in a heading die to form said head.

Another object of this invention is to provide improved die mechanism for rapidly and economically producing pipe plug blanks by the use of segments of polygonal wire stock having substantially the same cross-sectional size and shape as the polygonal head of the completed blank and in which one of a pair of cooperating die members has a round die recess in which one end of the segment is upset and pressure-formed to the shape of the substantially cylindrical body of the blank and the other die member has a polygonal die recess of the same cross-sectional size and shape as said head and in which the other end of the segment is received in polygonally registering relation and is confined thereby and subjected to a sizing and trueing action by the pressure of the upsetting and forming operation.

Still another object of this invention is to provide an improved die mechanism for rapidly and economically producing pipe plug blanks by upsetting and pressure-shaping a segment of polygonal wire stock of the same cross-sectional size and shape as the polygonal head of the completed blank and in which a pair of cooperating die members have complemental die recesses forming a closed die chamber adapted to trap a segment of such polygonal wire stock therein.

As a further object, this invention provides improved die mechanism of the character mentioned in which one of a pair of cooperating die members is a heading die having a polygonal die recess of the same cross-sectional size and shape as the polygonal head of the completed blank and the other die member is a punch having a die recess of substantially the size and shape of the upset cylindrical body of the blank and such punch having an axial opening with an upsetting pin slidable therein.

Other objects and advantages of this invention will be apparent in the following detailed description and in the accompanying drawings in which, Fig. 1 is a fragmentary plan view with portions thereof in horizontal section, showing mechanism constructed according to the present invention;

Figure 1:
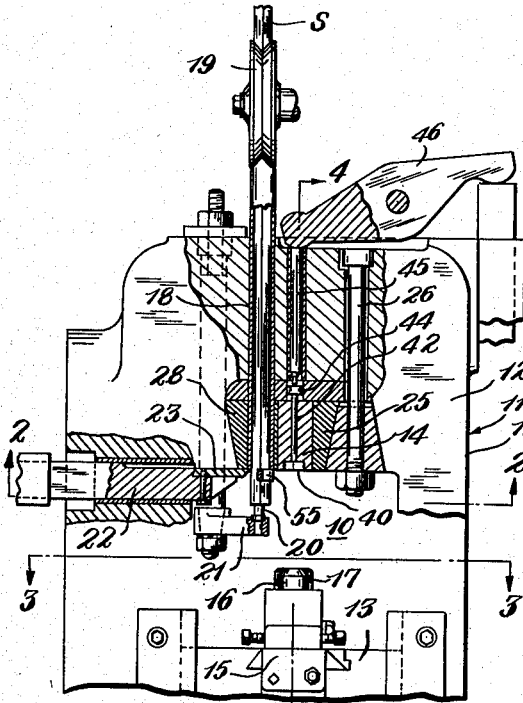

The improved die mechanism for producing pipe plug blanks from polygonal wire stock can be embodied in or aplied to various forms of commercially available heading machines. By way of example, the drawings show the improved die mechanism 10 being used in a heading machine 11 of a commercially available type and which can be further briefly identified as a crank actuated double stroke solid die header. Since the header 11 is of a type whose construction and operation are well known in the art, a detailed description thereof is deemed unnecessary. In general, however, the header 11 comprises a frame 12 and a ram or gate 13 reciprocably operable therein and actuated by a crankshaft. The end portion 12a of the frame forms a mount for one portion of the die mechanism which includes a stationary heading die 14 and will be further described hereinafter. The gate 13 includes a slide 15 which is vertically movable in a direction transverse to the path of reciprocating travel of the gate and carries the other portion of the die mechanism which includes a pair of upper and lower punches 16 and 17.

As shown in Fig. 1, the header 11 includes a feed tube or quill 18 through which wire stock S is adapted to be fed or advanced to a cut-off station by a pair of cooperating feed rolls 19. The header also includes a stop 20 carried by an arm 21 and located to be engaged by the inner end of the wire stock for determining the length of segment to be cut therefrom. Additionally, the header 11 includes a reciprocably movable cut-off slide 22 carrying a knife 23 by which successive segments are cut from the leading end of the stock S in timed relation to the reciprocation of the gate 13.

The die mechanism 10 includes a die holder 25 adapted to be connected to the end portion 12a of the frame 12 by suitable clamping bolts 26 and in which the heading die 14 is mounted.

The die mechanism also includes a stock guiding sleeve 28 extending through the holder 25 to the cut-off station and with which the knife 23 cooperates in shearing relation for severing the segments from the leading end of the wire stock S.

The punches 16 and 17 of the die mechanism 10 are mounted in vertically aligned relation in a second die holder 29 which is attached to the slide 15 by means of suitable clamping bolts 30. The punches 16 and 17 are moved into and out of cooperating relation with the heading die 14 by the reciprocation of the gate 13 and are shifted vertically by the slide 15 so that these punches are alternately brought into alignment with the heading die.

The die mechanism 10 also includes suitable transfer means 31 having a depending resilient finger 32 which cooperates with the cut-off blade 23 and the slide 22 for transferring the severed segment to a position in alignment with the heading die 14. The transfer mechanism 31 is actuated as a part of the header 11 in timed relation to the movements of the gate 13 and the slide 15.

Figures 12, 14:
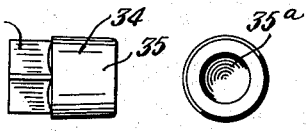
Fig. 12 is a side elevation showing the completed pipe plug blank resulting from the second forming operation.

Before proceeding further with the detailed description of the die mechanism 10 and its operation, a brief description should be given of the pipe plug blank 34 which is produced by the present invention. As shown in Fig. 12, the pipe plug blank 34 comprises a substantially solid metal member having a body portion 35 and a head 36 integral with such body portion at one end thereof. The body portion 35 is cylindrical in shape, except for a slight longitudinal taper corresponding with the taper usually provided on pipe threads, and is adapted to be threaded by cutting or rolling a helical thread thereon. The threading of the body portion 35 is preferably accomplished by a thread rolling operation because when the threads are formed in this manner the cold working of the metal produces a stronger thread than would be obtained if the threads were formed by a cutting die. The head 36 is of a polygonal shape and in this instance, is substantially square.

Figure 7:
Fig. 7 is a side elevation showing a segment of wire stock of polygonal cross-section intended for use in making a pipe plug blank in accordance with the present invention.
Figure 8:
Fig. 8 is an end view of the segment.

An important feature of the present invention is the use of a polygonal cross-sectional shape in the wire stock S for producing the pipe plug blank 34. When the pipe plug has a square head, as represented by the head 36, the polygonal wire stock used is of a square cross-sectional shape and is of substantially the same transverse dimensions as the head 36. Figs. 7 and 8 show a segment 37 which has been cut from the leading end of the wire stock S and which is of a length to provide substantially exactly the correct amount of metal for forming the pipe plug blank 34 without scrap or waste. The wire stock S and the segment 37, as well as the head 36 of the blank 34, are referred to herein as being of a square cross-sectional shape although the corners may be somewhat flattened or rounded, as indicated at 38.

Figure 10:
Figs. 10 and 11 are end views of opposite ends of the partially completed blank of Fig. 9.
Figures 9, 11:
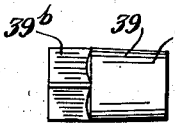
Fig. 9 is a side elevation of a partially completed pipe plug blank of the shape resulting from the first forming operation.
Figure 13:
Figs. 13 and 14 are end views of opposite ends of the completed blank.

Figs. 9, 10 and 11 show a blank 39 which represents an intermediate stage of the product in which the segment 37 has been partially formed into a pipe plug. This intermediate blank 39 is the result of the first forming operation performed by the die mechanism 10 and has a substantially cylindrical but slightly tapered body portion 39a and a polygonal head 39b of a square cross-sectional shape. The body portion 39a has been formed by upsetting a substantial portion of the length of the segment 37 and pressure-shaping such upset portion to the substantially round shape shown in Fig. 9. The body portion 39a is slightly smaller in diameter, but somewhat longer, than the body portion 35 of the completed blank 34. The head 39b is of substantially the same cross-sectional size and shape as the segment 37 and differs from the head 36 of the completed blank only through the fact that the head 36 has been sized and trued during the second forming operation. Since the heading die 14 serves both punches 16 and 17 and is used during both forming operations, the head 39b of the intermediate blank 39 may, in some cases, conform exactly in size and polygonal shape with the head 36 of the final blank 34.

Figure 2:
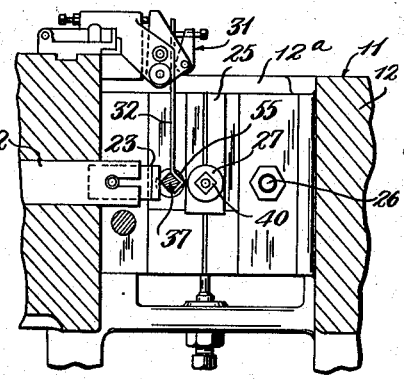
Fig. 2 is a fragmentary transverse vertical section taken on section line 2—2 of Fig. 1 and showing the heading die and cut-off means.
Figure 3:
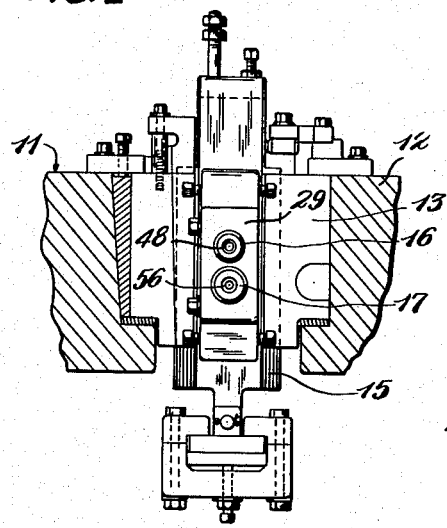
Fig. 3 is a fragmentary transverse vertical section taken on section line 3—3 of Fig. 1 and showing the double-stroke gate and the two punches carried thereby.
Figure 4:
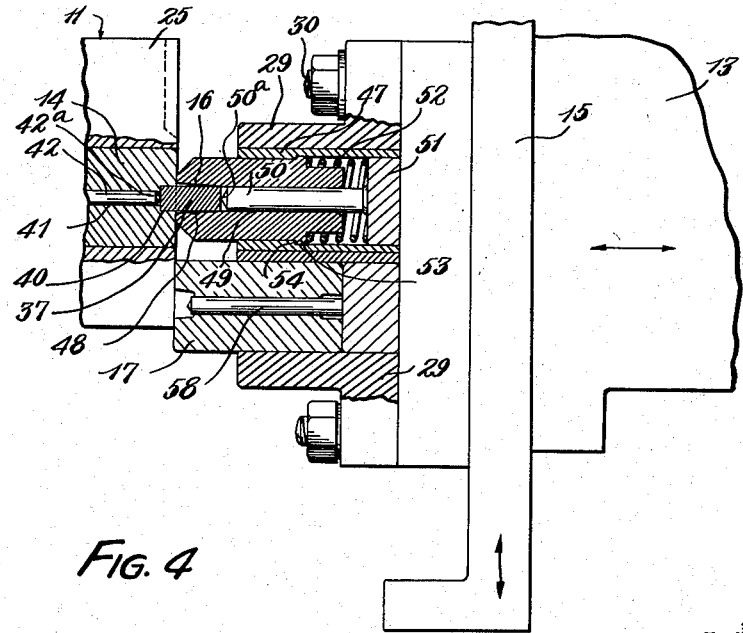
Fig. 4 is a fragmentary vertical longitudinal section taken on line 4—4 of Fig. 1, but showing the die members closed with a segment of polygonal wire stock trapped in the die chamber and about to be subjected to endwise pressure between the heading die and one of the punches for upsetting and shaping the blank.

As shown in Figs. 1, 2 and 4, the heading die 14 has a die recess 40 of polygonal shape in the outer end thereof. This die recess has the same size and cross-sectional shape as is desired for the head 36 of the completed blank 34 and which, in this instance, is a square shape. The square wire stock W being fed to the die mechanism 10 has substantially the same cross-sectional size and shape as the die recess 40 so that one end of the segment 37 will engage snugly therein upon closing of the die members for the first forming operation. The recess 40 has an axial depth corresponding with the axial length desired for the head 36 of the completed blank 34.

The heading die 14 also has an axial passage 41 extending centrally therethrough and communicating with the inner end of the recess 40. A knock-out pin 42 is slidable in the passage 41 and has a cone-shaped tip 42a thereon which projects slightly into the recess 40 for forming a slight depression or concavity 43 in the intermediate blank 39 and in the completed blank 34. If desired, the tip 42a of the knock-out pin 42 can be provided with a letter or symbol to be impressed on the article as a pipe size indication or as a trade-mark. The knock-out pin 42 has a head 44 on its inner end adapted to be engaged by the plunger 45 of the heading machine 11. The plunger 45 is actuated by suitable mechanism of the header which includes the pivoted lever 46, for causing the knock-out pin 42 to eject the completed blank from the heading die 14.

The upper punch 16 is an elongated die member which is slidable in a guide sleeve 47 of the die holder 29 and has a die recess 48 in its outer end. This die recess is substantially cylindrical but somewhat tapered or cone-shaped and corresponds in size and cross-sectional shape with the body portion 39a of the partially formed blank 39. The punch 16 also has an axial passage 49 therein which communicates with the die recess 48 and in which an upsetting pin 50 is slidable. The outer end of the pin 50 has a conical end 50a adapted to form the cone-shaped recess 39c in the upset end of the blank 39. The inner end of the pin 50 is connected with a block or head 51 which is disposed in the guide sleeve 47. A compression spring 52 located in the guide sleeve 47 has one end seated against the block 51 and its other end seated against an annular shoulder 53 of the punch 16. The spring 52 tends to shift the punch 16 outwardly of the guide sleeve 47 and normally holds the shoulder 53 in engagement with a stop shoulder 54 provided on the guide sleeve.

As shown in Fig. 4 of the drawings, the recess 48 of the punch 16 is adapted to cooperate with the polygonal recess 40 of the heading die 14 in forming a substantially closed die chamber in which the segment 37 is received. During the first of the two related strokes of the gate 13, the first or upper punch 16 is moved toward the heading die 14 along the axis thereof and upon engagement of the outer end of this punch with the heading die the two die recesses 40 and 48 form the above-mentioned closed die chamber.

Prior to the engagement of the punch 16 with the heading die 14 the segment 37 is sheared from the leading end of the polygonal wire stock W by the cut-off blade 23. The lateral movement of the cut-off blade assisted by the transfer finger 32 carries the segment 37 to a position in front of the recess 40 of the heading guide 14. During the closing movement of the punch 16, one end of the segment 37 enters the die recess 48 of the punch and the segment is carried forward by the punch so that its other end enters the die recess 40 of the heading die 14. This results in the die members 16 and 14 assuming the position shown in Fig. 4, in which the die recesses 40 and 48 form the closed die chamber and the segment 37 is trapped in this chamber ready to be upset and subjected to the pressure-shaping operation.

It is an important characteristic of the die members just described above for the first forming operation, that the die recesses 40 and 48 are of such length that when the outer end of the punch 16 engages the heading die 14 and is held against the latter by the spring 52, the combined length of these recesses will be at least equal to or greater than the initial length of the segment 37. This relationship permits the die chamber to be completely closed with the segment 37 therein before any upsetting of the segment is produced by the upsetting pin 50. Since the die chamber is closed before the upsetting begins and is maintained closed by the spring 52 during the entire upsetting action, this first forming operation is carried out without formation of any flash whatever on the intermediate blank 39.

In connection with the cutting of the segment 37 from the wire stock W and transferring the same to a position of alignment with the heading die 14, it should be noted that as the stock is fed to the cut-off means it is disposed with one pair of opposed longitudinal corners lying in a vertical plane and the other pair of opposed corners lying in a horizontal plane. The transfer finger 32 is provided at the lower end thereof with an angular portion 55 formed by two connected straight portions which define a laterally outwardly facing included angle corresponding with one of the laterally disposed corners of the stock W. By providing the transfer finger 32 with this angularly disposed portion, it will be seen that one corner of the segment 37 will seat in this included angle and the segment will thus be held by the transfer finger in such position that when it arrives in front of the recess 40 of the heading die 14, it will be properly aligned for polygonally registering engagement in this die recess.

The forward movement of the gate 13 occurring after the segment 37 has been trapped in the closed die chamber formed by the recesses 40 and 48, as explained above, causes the segment to be subjected to endwise pressure between the upsetting pin 50 and the heading die 14. During this final closing movement of the gate, the punch 16 is pushed backwardly in the guide sleeve 47 in opposition to the spring 52 by its engagement with the heading die 14 and slides on the upsetting pin 50. The portion of the segment 37 which extends into the recess 48 is thereby subjected to an upsetting operation by which it is enlarged or expanded and simultaneously shaped by the recess 40 to form the round or tapered body portion 39a of the intermediate blank 39.

During this first upsetting and pressure-shaping operation the outer end of the segment 37 is snugly engaged in the polygonal recess 40 of the heading die 14. The metal of this outer end of the segment is not upset because of the existing snug fit, but is confined by this die recess and is subjected to a shaping and forming operation therein by the endwise pressure being applied to the blank so that this outer end of the segment will be given a size and shape corresponding with the size and shape of the head 39b of the intermediate blank 39.

Figure 5:
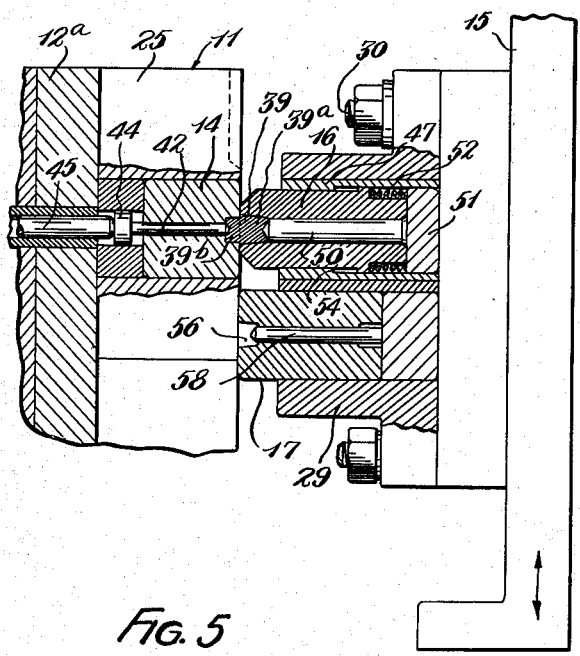
Fig. 5 is a fragmentary vertical longitudinal section similar to Fig. 4, but showing the relative positions of the die members and the condition of the blank at the completion of the first forming operation.

Fig. 5 of the drawings shows the condition of the die mechanism 10 and the workpiece when the closing movement of the gate 13 has caused the upsetting pin 50 to continue its relative forward movement beyond the position illustrated in Fig. 4 to complete the first forming operation. As shown in this view the forward movement of the upsetting pin in the passage 49 of the punch 16 in cooperation with the stationary heading die 14 has subjected the segment 37 to endwise pressure and has upset a substantial portion of the length of the segment in the die recess 48 to form the body portion 39a. At the completion of the first forming operation illustrated in Fig. 5 and just described above, the gate 13 moves away from the heading die 14 causing the punch 16 to be disengaged from the formed body portion 39a and leaving the blank 39 with the head 39b thereof sticking in the die recess 40 of the heading die. The slide 15 then moves upwardly bringing the second or lower punch 17 into alignment with the heading die 14 and the next succeeding stroke of the gate 13 moves the second punch toward the heading die to carry out the second and final forming operation on the blank, as illustrated in Fig. 6.

The punch 17 comprises an elongated die member which is mounted in fixed relation in the die holder 29. The punch 17 has a die recess 56 in its outer end which is adapted to cooperate with the die recess 40 of the heading die 14 to form a second closed die chamber. The punch 17 may also have an axial passage 57 therein in which a pin 58 is mounted for closing the inner end of the die recess 56. The outer end of the pin 58 has a cone-shaped tip 58a which projects into the recess 56 and forms the depression 35a in the end of the body portion 35 of the completed blank 34.

Figure 6:
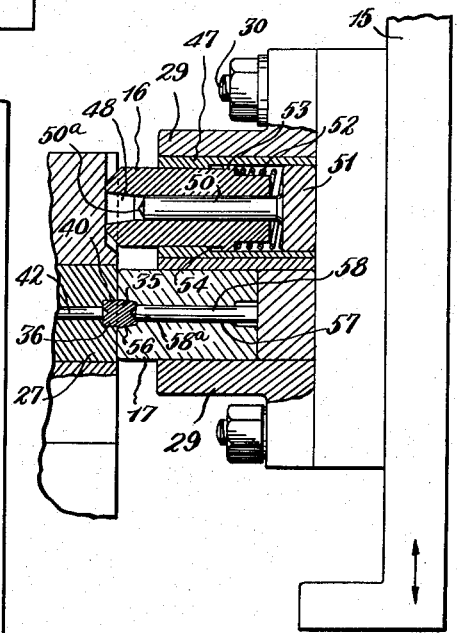
Fig. 6 is another fragmentary vertical longitudinal section similar to Fig. 4, but showing the relative positions of the die members and the condition of the blank at the completion of the second forming operation.

The movement of the punch 17 by the gate 13 to the closed position shown in Fig. 6 causes the body portion 39a of the blank 39 to be further upset and subjected to another pressure-forming operation by which this portion of the blank is given the final shape of the body portion 35 of the completed blank 34. During this second forming operation the head portion 39b of the intermediate blank 39 is again confined in the die recess 40 and is subjected to a further pressure-shaping operation for imparting thereto a relatively true and accurate polygonal shape corresponding with the size and shape desired for the head 36 of the completed blank 34.

It is important to note that since the segment 37 is trapped in the die chamber formed by the cooperating die members 14 and 16 prior to the first upsetting and forming operation, none of the metal of the blank can escape by being squeezed out between the die members and, hence, the first forming operation is carried out without producing any flash or fin of waste metal on the blank. Similarly, in the second forming operation the intermediate blank 39 is again trapped in a die chamber formed by the cooperating die members 14 and 17 and the final shaping operation is likewise carried out without the formation of any flash on the blank. This is important because the completed blank 34 is obtained in an accurately shaped condition and without any fin or flash thereon which, if present, would need to be trimmed off and would represent waste metal in the form of scrap. Moreover, such a trimming operation would require an additional operation and die station and this would necessitate the use of a more complex form of heading machine than the simple two stroke header here shown.

At the completion of the second forming operation the gate 13 moves the punch 17 away from the heading die 14 and the completed blank 34 is thereupon ejected from the recess 40 by the knock-out pin 42 and drops into a suitable chute or container (not shown).

The pipe plug blanks 34 thus produced are more accurate and regular in shape than would be obtainable by making such blanks out of cast metal. Moreover, since the head 36 of the blank has been formed by a portion of the polygonal segment 37 and conforms substantially in cross-sectional size and shape with the segment, it will be seen that a polygonal head of the desired cross-sectional size and shape is obtained directly from the segment of stock without requiring heavy working pressures for causing a flow of metal such as would otherwise be necessary to fill out the corners of a square head. The only shaping which is needed on the portion of the segment which forms the head 36 is for sizing and trueing this portion of the blank and imparting thereto a smooth and regular shape.

The completed blanks 34 obtained from the above described apparatus and method are immediately available for the threading of the body portion 35. This is accomplished preferably by a thread rolling operation, as mentioned above, during which a helical thread is formed on the periphery of the body portion 35 by thread forming rolls of a conventional type.

From the foregoing description and the accompanying drawings it will now be readily understood that this invention provides an improved mechanism by which pipe plug blanks, and articles of like character, can be rapidly and economically produced from polygonal wire stock with the polygonal head of the blank being formed directly by an end portion of the polygonal stock such that the heavy die pressures heretofore needed for filling out the corners of the polygonal shape of the head are avoided. It will be seen also that, as explained above, pipe plug blanks of an accurate and regular shape are consistently obtained and are devoid of flash which would represent waste metal and would require an extra operation for trimming the same from the blank. Moreover, since the die members are required to apply only moderate pressures to the workpiece, they will have a long life.

Although the improved apparatus has been illustrated and described herein to a somewhat detailed extent, it will be understood, of course, that the invention is not to be regarded as being limited correspondingly in scope but includes all changes and modifications coming within the terms of the claims hereof.

Having thus described my invention, I claim:

1. In apparatus for forming pipe plug blanks of the type having a substantially cylindrical body adapted to be threaded and a polygonal head integrally connected with one end of said body, means for feeding polygonal wire stock having a cross-sectional size and shape corresponding approximately with the cross-sectional size and shape of said head, a heading die having therein a polygonal die recess of the size and shape of said head, a hollow punch holder axially movable toward and away from said heading die, a pin extending coaxially in said punch holder and movable therewith relative to said heading die, a punch slidable in said holder and having a substantially round die recess in its outer end for cooperation with said polygonal die recess in forming a closed die chamber and also having an axial passage connected with said round die recess and slidable on said pin, said round die recess having the size and shape of said body, a compression spring normally urging said punch outwardly of said holder, means for cutting a segment from said stock, transfer means adapted to position said segment relative to said die and punch for polygonally registering engagement of one end of the segment in said polygonal die recess, and means for moving said punch holder and pin toward said die and subjecting the segment to endwise pressure for upsetting a portion of the segment in said round die recess and shaping the same therein to form said body and for also sizing and trueing said one end of the segment in said polygonal die recess for forming said head, said spring being effective to hold said punch in engagement with said die for maintaining the die chamber closed during the application of said endwise pressure to the segment.

2. In apparatus for forming a pipe plug blank or like article having a polygonal head and a substantially cylindrical body adapted to be threaded, a pair of die members having cooperating die recesses therein, means for supplying to said die members a segment of polygonal stock having a cross-sectional size and shape corresponding approximately with the size and shape of said head, one of said die recesses having substantially the size and shape of said body and the other having substantially the size and shape of said polygonal head and being adapted to receive one end of said polygonal segment in fitting engagement therein, one of said die members having an axial passage communicating with the die recess thereof, an upsetting pin slidable in said passage, and actuating means operable to cause relative closing movement between said die members such that said die recesses form a closed die chamber and to also cause movement of said upsetting pin in said passage in a direction to upset said segment in said closed die chamber, said die recesses having a combined axial length at least equal to the initial length of said segment such that said segment is trapped in said closed die chamber prior to the upsetting of said segment by said pin.

3. In apparatus for forming a pipe plug blank and like article having a polygonal head and a substantially cylindrical body adapted to be threaded, a pair of cooperating die members having recesses therein adapted to define a closed die chamber, means for supplying to said die members a segment of polygonal stock having a cross-sectional size and shape corresponding approximately with the size and shape of said head, said die members comprising a body forming die member whose die recess has substantially the size and shape of said body and a head forming die member whose die recess has substantially the size and shape of said head and is adapted to receive one end of said polygonal segment in fitting engagement therein, said body forming die member having an axial passage communicating with the die recess thereof, an upsetting pin slidable in said passage, and actuating means operable to cause relative closing movement between said die members such that said die recesses form said closed die chamber and to also cause movement of said upsetting pin in said passage in a direction to upset said segment in said closed die chamber, said die recesses having a combined axial length at least equal to the initial length of said segment such that said segment is trapped in said closed die chamber prior to the upsetting of said segment by said pin.

4. In apparatus for forming a pipe plug blank or like article having a polygonal head and a substantially cylindrical body adapted to be threaded, a pair of die members having cooperating die recesses therein, means for supplying to said die members a segment of polygonal stock having a cross-sectional size and shape corresponding approximately with the size and shape of said head, one of said die recesses having substantially the size and shape of said body and the other having substantially the size and shape of said polygonal head and being adapted to receive one end of said polygonal segment in fitting engagement therein, one of said die members having an axial passage communicating with the die recess thereof, an upsetting pin slidable in said passage, actuating means operable to cause relative closing movement between said die members such that said die recesses form a closed die chamber and to also cause movement of said upsetting pin in said passage in a direction to upset said segment in said closed die chamber, said die recesses having a combined axial length at least equal to the initial length of said segment such that said segment is trapped in said closed die chamber prior to the upsetting of said segment by said pin, and spring means effective for maintaining said die members closed during the upsetting of said segment by said pin.

5. In apparatus for forming a pipe plug blank or like article having a polygonal head and a substantially cylindrical body adapted to be threaded, a pair of cooperating die members having recesses therein adapted to define a closed die chamber, means for supplying to said die members a segment of polygonal stock having a cross-sectional size and shape corresponding approximately with the size and shape of said head, said die members comprising a body forming die member whose die recess has substantially the size and shape of said body and a head forming die member whose die recess has substantially the size and shape of said head and is adapted to receive one end of said polygonal segment in fitting engagement therein, said body forming die member having an axial passage communicating with the die recess thereof, an upsetting pin slidable in said passage, actuating means operable to cause relative closing movement between said die members such that said die recesses form said closed die chamber and to also cause movement of said upsetting pin in said passage in a direction to upset said segment in said closed die chamber, said die recesses having a combined axial length at least equal to the initial length of said segment such that said segment is trapped in said closed die chamber prior to the upsetting of said segment by said pin, and spring means effective on said body forming die member for maintaining said die members closed during the upsetting of said segment by said pin.

6. In apparatus for forming a pipe plug blank or the like having a substantially cylindrical body adapted to be threaded and a polygonal head integrally connected with one end of said body, means for feeding polygonal wire stock having a cross-sectional size and shape corresponding approximately with the cross-sectional size and shape of said head, a pair of die members having cooperating die recesses therein adapted to define a closed die chamber, one of said die members being a body forming die member whose die recess is substantially round and has substantially the size and shape of said body and the other die member being a head forming die member whose recess is a polygonal die recess having substantially the size and shape of said head, means for cutting a segment from said stock, transfer means adapted to position said segment relative to said die members for registering engagement of one end of the segment in said polygonal die recess, said transfer means including a finger having angularly disposed end portions defining an included angle in which a corner of said segment is non-rotatably engageable, said body forming die member having an axial passage communicating with the die recess thereof, an upsetting pin slidable in said passage, and actuating means operable to cause relative closing movement between said die members such that said die recesses form said closed die chamber and to also cause movement of said upsetting pin in said passage in a direction to upset said segment in said closed die chamber, said die recesses having a combined axial length at least equal to the initial length of said segment such that said segment is trapped in said closed die chamber prior to the upsetting of said segment by said pin.

7. In apparatus for forming a pipe plug blank or the like having a substantially cylindrical body adapted to be threaded and a polygonal head integrally connected with one end of said body, a heading die having therein a polygonal die recess of substantially the size and shape of said head, a hollow punch holder axially movable toward and away from said heading die, an upsetting pin extending coaxially in said punch holder and movable therewith relative to said heading die, a punch slidable in said holder and having a substantially round die recess in its outer end for cooperation with said polygonal die recess in forming a closed die chamber and also having an axial passage connected with said round die recess and slidable on said pin, said round die recess having substantially the size and shape of said body, a compression spring normally urging said punch outwardly of said holder, means for supplying for endwise polygonally registering engagement in said heading die a segment of polygonal stock having a cross-sectional size and shape corresponding approximately with the size and shape of said head, and means for moving said punch holder and pin toward said die and subjecting the segment to endwise pressure for upsetting a portion of the segment in said round die recess and shaping the same therein to form said body and for also sizing and trueing one end of the segment in said polygonal die recess for forming said head, said polygonal die recess and said round die recess having a combined axial length at least equal to the initial length of said segment such that said segment is trapped in said closed die chamber prior to the upsetting of said segment by said pin, said spring being effective to hold said punch in engagement with said die for maintaining the die chamber closed during the application of said endwise pressure to the segment.

PAUL A. ESTOK.

REFERENCES CITED

The following references are of record in the file of this patent:

UNITED STATES PATENTS

| Number | Name | Date |
|---|---|---|
| 1,340,166 | Graham | May 18, 1920 |
| 1,805,384 | Vis | May 12, 1931 |
| 1,892,030 | Anderson | Dec. 27, 1932 |
| 1,900,572 | Lyman | Mar. 7, 1933 |
| 1,933,737 | Kaufman | Nov. 7, 1933 |
| 2,090,338 | Tomalis | Aug. 17, 1937 |
| 2,204,043 | Maclagan | June 11, 1940 |
| 2,265,428 | Hogue | Dec. 9, 1941 |